US010867397B2

(12) United States Patent
Kuo

(10) Patent No.: US 10,867,397 B2
(45) Date of Patent: Dec. 15, 2020

(54) VEHICLE WITH A DRIVING ASSISTANCE SYSTEM WITH A LOW POWER MODE

(71) Applicant: Shanghai XPT Technology Limited, Shanghai (CN)

(72) Inventor: Bou-Chen Kuo, Taipei (TW)

(73) Assignee: Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 16/550,264

(22) Filed: Aug. 25, 2019

(65) Prior Publication Data

US 2020/0167935 A1 May 28, 2020

(30) Foreign Application Priority Data

Jun. 26, 2018 (CN) .......................... 2018 1 0668308
Jun. 26, 2018 (CN) ..................... 2018 2 0989702 U

(51) Int. Cl.
*G06T 7/246* (2017.01)
*G06T 7/00* (2017.01)
*B60Q 9/00* (2006.01)
*B60R 11/04* (2006.01)
*B60R 11/00* (2006.01)
*B60R 16/03* (2006.01)

(52) U.S. Cl.
CPC ............... *G06T 7/246* (2017.01); *G06T 7/97* (2017.01); *B60Q 9/008* (2013.01); *B60R 11/04* (2013.01); *B60R 16/03* (2013.01); *B60R 2011/0003* (2013.01); *G06T 2207/10016* (2013.01); *G06T 2207/30241* (2013.01); *G06T 2207/30256* (2013.01)

(58) Field of Classification Search
CPC ................................. G06T 7/246; G06T 7/97
See application file for complete search history.

(56) References Cited

U.S. PATENT DOCUMENTS

| | | | |
|---|---|---|---|
| 10,018,703 B2* | 7/2018 | Bernal | G06T 7/20 |
| 2010/0106418 A1* | 4/2010 | Kindo | G05D 1/027 |
| | | | 701/300 |
| 2010/0171828 A1* | 7/2010 | Ishii | G06T 7/246 |
| | | | 348/135 |
| 2015/0151725 A1* | 6/2015 | Clarke | B60W 30/14 |
| | | | 701/28 |

(Continued)

FOREIGN PATENT DOCUMENTS

EP    2 562 060 A1    2/2013

*Primary Examiner* — Jonathan R Messmore
(74) *Attorney, Agent, or Firm* — Winston Hsu

(57) ABSTRACT

A vehicle equipped with a driving assistance system with a low power mode, the vehicle includes an image capturing device and a processor. The image capturing device capture external scenes outside of the vehicle to generate a series of observing images. In a low power mode, the processor identifies a second vehicle and a plurality of features on exterior of the second vehicle, determines a reference vector corresponding to a travel direction of the second vehicle according to at least two features, and determines if a change of a detection value relating to the reference vector in the series of observing images exceeds a predetermined threshold. When the reference vector exceeds the predetermined threshold, the processor determines that the second vehicle has changed the travel direction.

18 Claims, 6 Drawing Sheets

(56) References Cited

U.S. PATENT DOCUMENTS

| | | | |
|---|---|---|---|
| 2016/0178331 A1* | 6/2016 | Sharpin | F42B 15/01 |
| | | | 244/3.22 |
| 2017/0098304 A1* | 4/2017 | Blais-Morin | G06T 7/246 |
| 2017/0220875 A1* | 8/2017 | Jeromin | H04N 5/247 |
| 2017/0330333 A1* | 11/2017 | Lin | G06T 7/246 |

* cited by examiner

VEHICLE WITH A DRIVING ASSISTANCE SYSTEM WITH A LOW POWER MODE

BACKGROUND OF THE INVENTION

1. Field of the Invention

The present invention is related to a vehicle equipped with a driving assistance system, and more particularly to a driving assistance system with a low power mode.

2. Description of the Prior Art

Generally, when driving a vehicle, the driver may not only need to pay attention to the road ahead, but also need to occasionally check if any vehicles coming from the rear or the side. If the driver encounters a complicated traffic situation, he/she would need to concentrate on the observation and making reaction timely, which can be very energy-consuming. However, if the traffic conditions are relatively smooth and monotonous, the driver may become fatigued or careless. As a result, when the traffic event happens suddenly, the driver may not be able to react to the event timely, thereby causing a car accident.

Nowadays, the driving assistance system can help to detect the traffic conditions and send warnings to the drivers to improve the driving safety. However, as the development of electric cars grows, the power consumption on the electric car is also facing increasingly strict requirements. In addition, since the vehicle electronic system supports more and more applications, the power consumption may become a burden to the vehicle if the vehicle electronic system remains activated for all applications throughout the whole journey.

SUMMARY OF THE INVENTION

On embodiment of the present invention discloses a vehicle equipped with a driving assistance system with a low power mode. The driving assistance system includes an image capturing device and a processor.

The image capturing device is disposed in the vehicle, and captures external scenes outside of the vehicle to generate a series of observing images. When in the low power mode, the processor identifies a second vehicle and a plurality of features on exterior of the second vehicle in the series of observing images, determines a reference vector corresponding to a travel direction of the second vehicle according to at least two of the plurality of features, determines if a change of a detection value relating to the reference vector in the series of observing images exceeds a predetermined threshold, and in response to determining that the change of the detection value relating to the reference vector in the series of observing images exceeds the predetermined threshold, determines that the second vehicle has changed the travel direction.

The plurality of features are exterior structures on a body of the second vehicle, and the plurality of features are located at fixed positions relative to a road surface.

Another embodiment of the present invention discloses a method. The method includes generating, by an image capturing device disposed in a first vehicle, a series of observing images of external scenes outside of the first vehicle, identifying, by a processor of the first vehicle driving assistance system in the first vehicle when operating in a low power mode, a second vehicle and a plurality of features on exterior of the second vehicle in the series of observing images, determining, by the processor, a reference vector corresponding to a travel direction of the second vehicle according to at least two of the plurality of features, determining, by the processor, if a change of a detection value relating to the reference vector in the series of observing images exceeds a predetermined threshold, and in response to determining that the change of the detection value relating to the reference vector in the series of observing images exceeds the predetermined threshold, determining that the second vehicle has changed in the travel direction.

The plurality of features are exterior structures on a body of the second vehicle, and the plurality of features are located at fixed positions relative to a road surface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
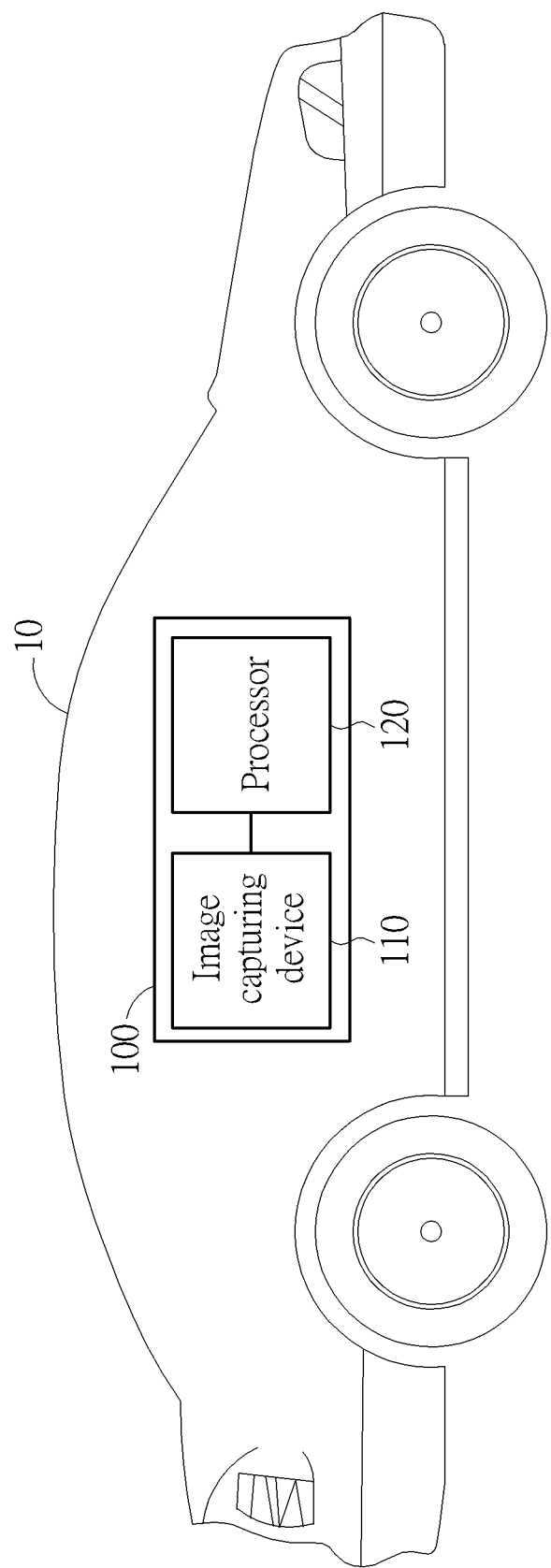
FIG. 1 shows a vehicle equipped with a driving assistance warning system according to one embodiment of the present invention.

FIG. 1 shows a vehicle 10 equipped with a driving assistance warning system 100 according to one embodiment of the present invention. The driving assistance warning system 100 includes an image capturing device 110 and a processor 120.

Figure 2:
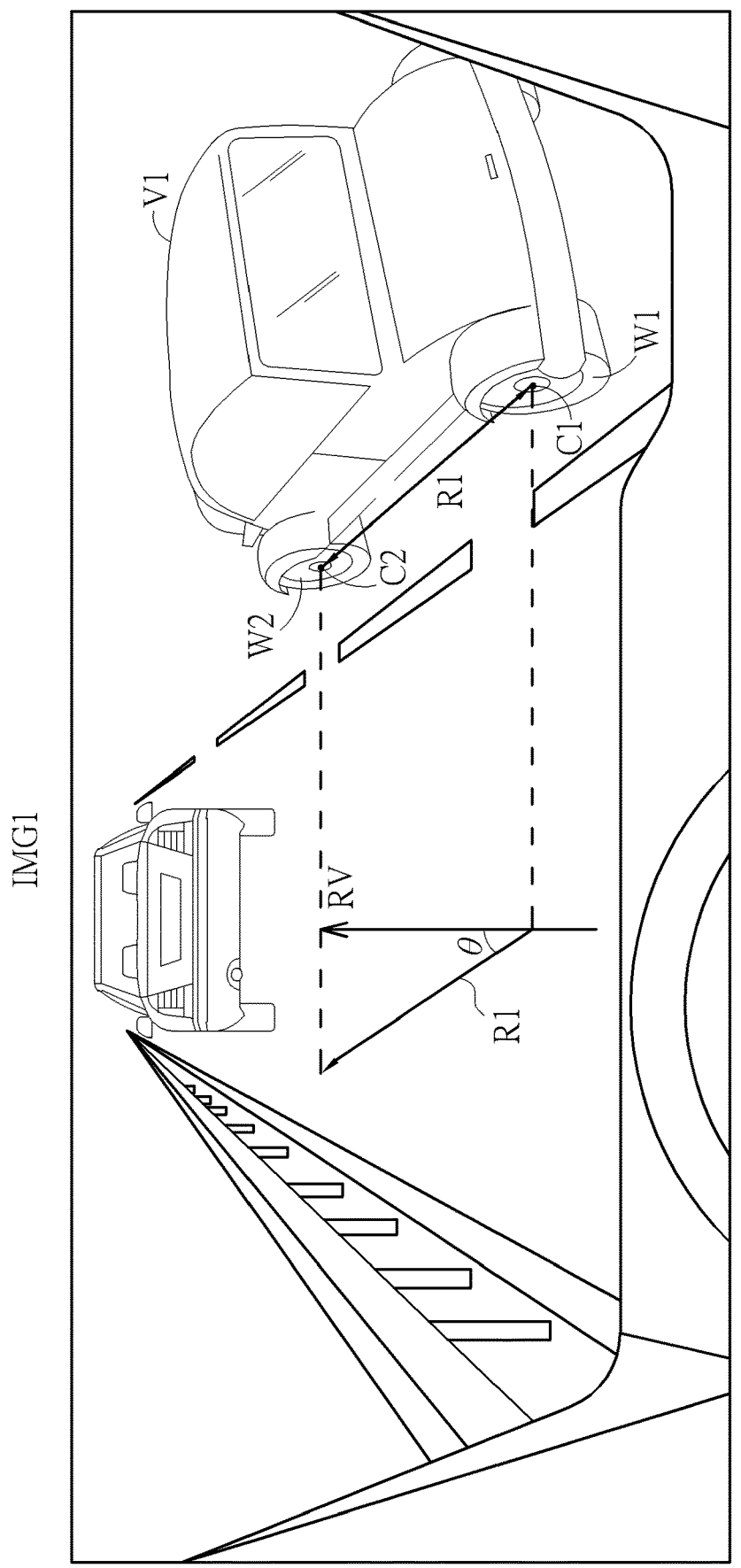
FIGS. 2-5 show the observing images captured by the image capturing device in FIG. 1.

The image capturing device 110 is disposed in a vehicle 10, and can capture external scenes outside of the vehicle 10 to generate a series of observing images. FIG. 2 shows an observing image IMG1 captured by the image capturing device 110. In some embodiments, the image capturing device 110 can capture color images or black and white images, and can capture the external scenes periodically to generate the observing images.

In a low power mode, the processor 120 can identify a front vehicle V1 and a plurality of features on the vehicle V1 in the series of observing images. These features can be exterior structures on a body of the vehicle V1, and the plurality of features are located at fixed positions relative to a road surface. That is, the processor 120 can choose objects on the vehicle V1 that have fixed positions to be the features. For example, the processor 120 can identify the vehicle V1 in each observing image, and further identify the two grips on the doors at the same side of the vehicle V1 or the two wheels at the same side of the vehicle V1 as the features. In some embodiments, the reference vector R1 can be determined by locating the center points of the two features and connecting the two center points.

For example, in FIG. 2, the wheels W1 and W2 of the vehicle V1 are chosen to be the features of the vehicle V1. In this case, the center points C1 and C2 of the wheels W1 and W2 can be connected to form the reference vector R1.

After the processor 120 identifies the features on the vehicle V1, the processor 120 can further determine the reference vector R1 corresponding to the travel direction of the vehicle V1 according to the two features on the vehicle V1. That is, the processor 120 can identify the features on the vehicle V1 in each of the observing images, and determine the corresponding reference vector on each observing images. Since the features identified by the processor 120 are corresponding to objects located at fixed positions on the vehicle V1, the change of the reference vector R1 will be related to the change of the travel direction of the vehicle V1. That is, by tracking the changes of the reference vector R1 in the series of observing images, the processor 120 will be able to identify the changes of the travel direction of the vehicle V1.

For example, the image capturing device 110 can capture the external scenes with a fixed angle outward the vehicle 10, and the reference vector R1 determined according to the grips or the wheels at the same side of the vehicle 10 should be in parallel with the road surface. Therefore, when using the grips or the wheels as features of the vehicle V1, the direction of the reference vector R1 can be used to determine the travel direction of the vehicle V1. In this case, the processor 120 can further determine if a change of a detection value relating to the reference vector R1 in the series of observing images exceeds a predetermined threshold, and if the change of the detection value relating to the reference vector R1 is determined to be exceeding the predetermined threshold, the processor 120 would determine that the vehicle V1 has changed its travel direction in response.

In some embodiments, the detection value relating to the reference vector R1 can be the angle between the reference vector R1 and a predetermined vector, and the predetermined vector can be a vertical vector in the series of observing images, or a vector corresponding to a traffic lane the vehicle 10 is traveling on. For example, in FIG. 2, since the angle θ exceeds a threshold angle, the detection value of the reference vector R1 in the observing image IMG1 would be determined to be exceeding a predetermined threshold. In this case, it may imply that the travel direction of the vehicle V1 is turning to be crossing with the driving direction of the vehicle 10, and may become a danger to the vehicle 10.

Therefore, the processor 120 can further identify the movement of the vehicle V1, and may also, according to the movement of the vehicle V1, send a warning signal to the vehicle 10, send a warning signal to the vehicle V1 or automatically control the vehicle 10 to avoid the front vehicle. That is, the processor 120 can exit the low power mode in response to determining that the travel direction of the vehicle V1 is changed. After exiting from the low power mode, the processor 120 can identify the movement of the vehicle V1, including the travel direction and speed, with more complicated computations. Consequently, the processor 120 can pre-identify the travel direction of the vehicle V1 with simple computations according to the two-dimensional images captured by a single image capturing device 110, and does not need to perform all the complicated computations at all times. Therefore, power consumption can be reduced, and the computation resource can be saved for other applications.

Furthermore, in some embodiments, the change of the angle θ can be used to determine the movement of the vehicle V1. For example, the processor 120 may determine that the vehicle V1 is turning into the travel path of the vehicle 10 when the change of the angle θ is positive. Also, the processor 120 may determine that the vehicle V1 is turning away from the travel path of the vehicle 10 when the change of the angle θ is negative.

In FIG. 2, the driving direction of the vehicle 10 is parallel to the vertical vector RV in the observing image IMG1 so the angle θ between the reference vector R1 and the vertical vector RV can be measured as the detection value relating to the reference vector R1. However, in some other embodiments, if the road line markings are clear enough, then the processor 120 may also measure the angle between the reference vector R1 and the road line marking as the detection value relating to the reference vector R1 for identifying the travel direction of the vehicle V1.

In addition, according to the moving speed of the vehicle 10, the acceptable predetermined threshold may also be different. For example, when the moving speed is rather low, if the direction of the vehicle V1 is changed slightly toward the travel direction of the vehicle 10, it may not pose an immediate threat. However, when the moving speed is rather high, even if the direction of the vehicle V1 is changed only slightly toward the travel direction of the vehicle 10, it may cause instant danger. Therefore, in some embodiments, the processor 120 can also set the predetermined threshold according to the moving speed of the vehicle 10, ensuring that the driving assistance warning system 100 can react to the traffic conditions in time.

Figure 3:
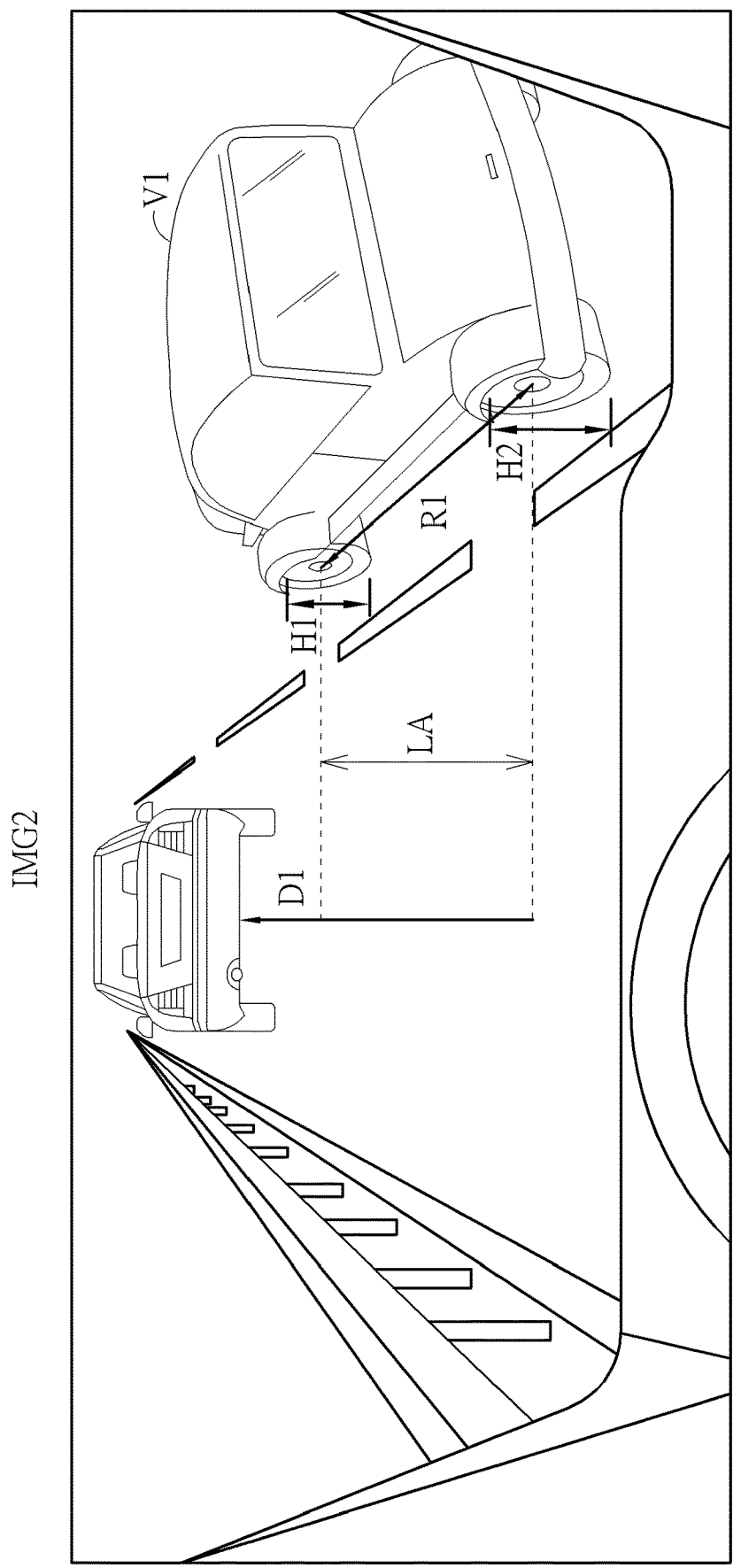
Figure 4:
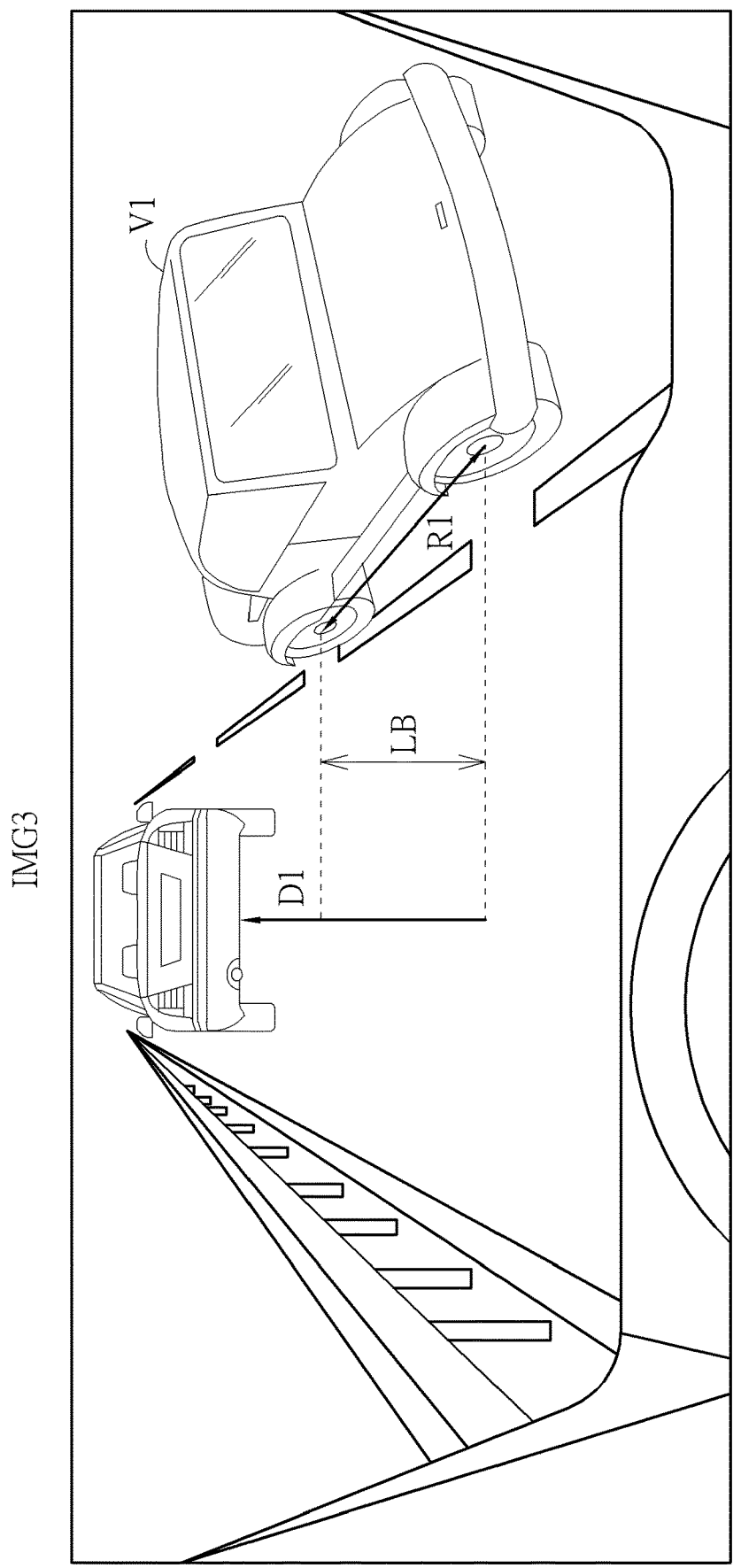

FIG. 3 and FIG. 4 show the observing images IMG2 and IMG3 of the series of observing images captured by the image capturing device 110.

In some embodiments, since images captured by the image capturing device 110 are two-dimensional, the projection length of the vehicle V1 along the observing direction in the observing image will be changed when the relative directions of the vehicle 10 and the vehicle V1 are changed, for example, when the vehicle V1 changes its direction. For example, in the observing image IMG2, the travel directions of the vehicle V1 and the vehicle 10 are in parallel. However, in the observing image IMG 3, the vehicle V1 has changed its direction and the travel direction of the vehicle V1 is no longer parallel to the travel direction of the vehicle 10. In this case, the projection length LA of the reference vector R1 along the observing direction D1 of the image capturing device 110 in the observing image IMG2 will be different from the projection length LB of the reference vector R1 along the observing direction D1 of the image capturing device 110 in the observing image IMG 3. In this case, the projection length LA is greater than the projection length LB.

In the embodiments shown in FIGS. 3 and 4, since the observing direction D1 of the image capturing device 110 is the vertical direction (perpendicular to the horizontal line) in the observing images IMG2 and IMG3, the processor 120 only needs to calculate the length between the two features along the vertical direction, that is, the vertical coordinate difference, when calculating the projection lengths LA and LB of the reference vector R1. Consequently, the computation can be further simplified.

In other words, in some embodiments of the present invention, the processor 120 can also use the projection length of the reference vector R1 along the observing direction of the image capturing device 110 as the detection value of the reference vector R1, and compare the detection value of the reference vector R1 with the predetermined threshold. However, in some other embodiments, the processor 120 may use other methods to obtain the detection value of the reference vector R1.

Furthermore, since the image capturing device 110 can be disposed at fixed positions of the vehicle 10, the position of the image capturing device 110, the distance between the image capturing device 110 and the road surface, and the capturing angle of the image capturing device 110 are known factors. That is, when the image capturing device 110 is set up, the parameters corresponding to its position (at the top of the vehicle, the head of the vehicle, or the side mirror of the vehicle) and the image capturing angle (looking up or looking down) can be recorded in the driving assistance warning system 100. Consequently, the processor 120 will be able to use the two-dimensional images captured by the image capturing device 110 even more efficiently to predict the actual positions of the objects in the three-dimensional reality space.

For example, since the features are at fixed positions on the vehicle V1, the relative positions of the vehicle V1 and the vehicle 10 in the three-dimensional reality space can be predicted according to the images captured by the image capturing device 110. In FIG. 3, since the distance between the wheel of the vehicle V1 and the road surface is usually known factor, therefore, the processor 120 can predict the relative positions of the vehicle V1 and the vehicle 10 in the three-dimensional reality space according to the heights H1 and H2 of the wheels in the two-dimensional image when the processor 120 identifies the wheels of the vehicle V1 from the images captured by the image capturing device 110. Consequently, the driving assistance warning system 100 is able to provide the more complete traffic information.

However, the accuracy of the processor 120 can be affected by the external environment. To avoid the processor 120 from misidentifying the traffic condition when the external environment is not in a good condition, which may cause danger to the driver due to late warnings, the processor 120 can also generate a trust index according to at least one environment condition, e.g., the weather condition and the environment brightness, in the observing images.

Figure 5:
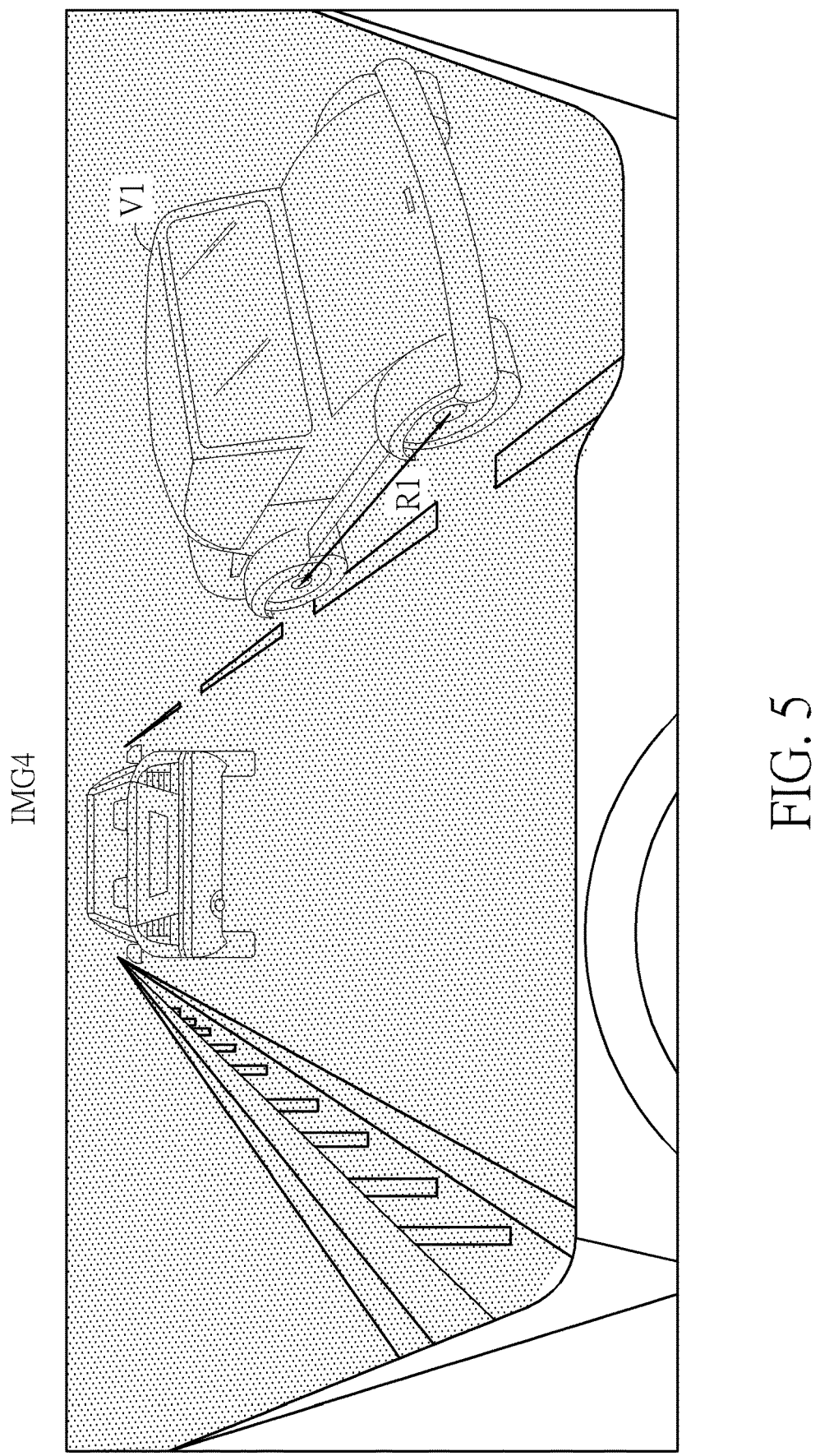

FIG. 5 shows an observing image IMG4 generated by the image capturing device 110. In the observing image IMG4, since the weather condition is thick fog and the environment brightness is not sufficient, the processor 120 may have a lower accuracy when identifying the features of the vehicle V1. In this case, the trust index generated by the processor 120 may be lower than a threshold value, and the processor 120 may make the driving assistance warning system 100 exit the low power mode so the processor 120 can identify the traffic condition by using more computations and with more dedicated algorithms, improving driving safety. In other words, the processor 120 can exit the low power mode automatically when it is rainy or too dark, and can use more dedicated algorithms to identify the traffic condition, avoiding the driving threats caused by misidentification.

Figure 6:
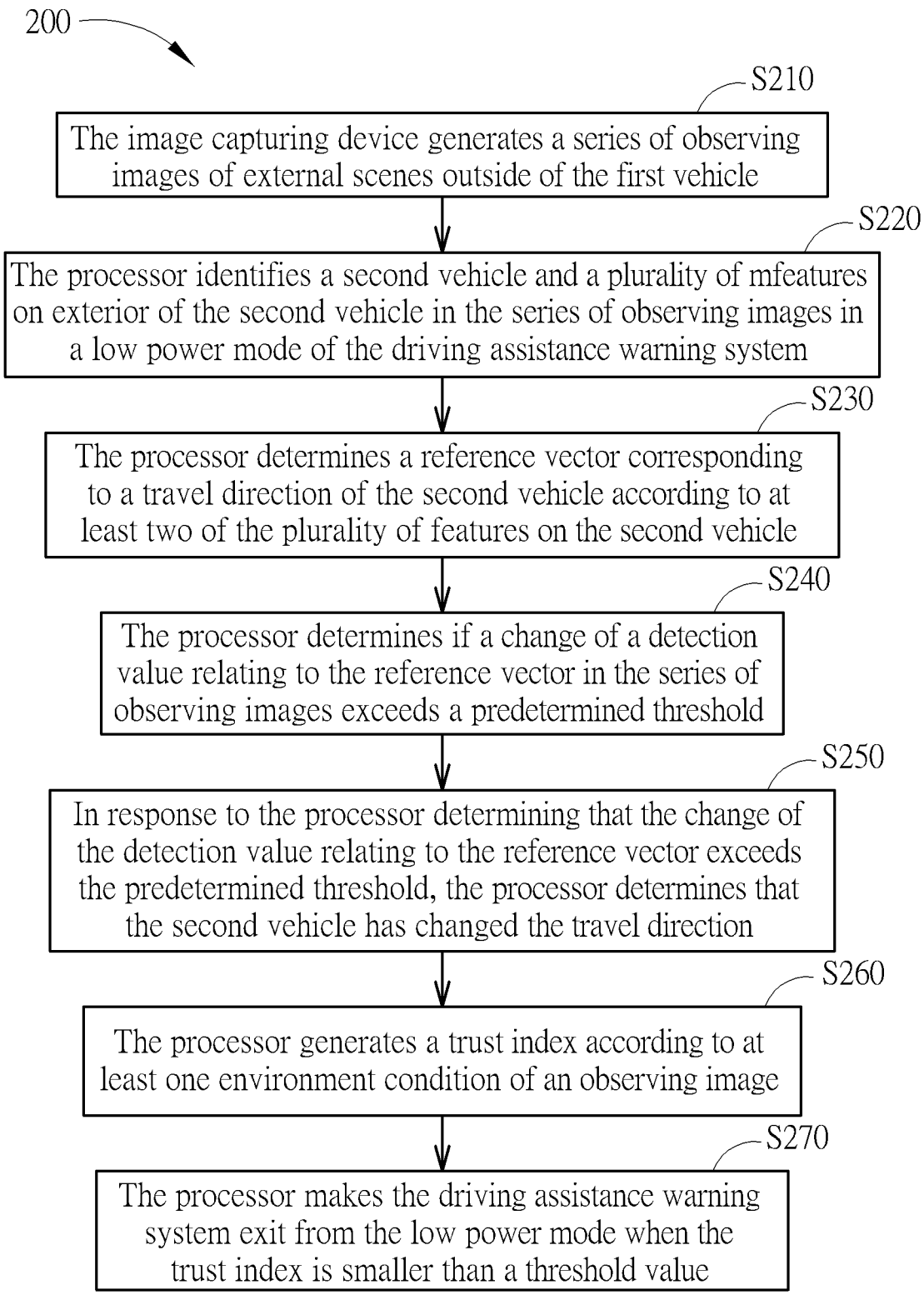
FIG. 6 shows a flow chart of a method for operating the driving assistance warning system in FIG. 1 according to one embodiment of the present invention.

FIG. 6 shows the flow chart of a method 200 for operating the driving assistance warning system 100 according to one embodiment of the present invention. The method includes steps S210 to S270, but is not limited to the order shown in FIG. 6.

S210: the image capturing device 110 generates a series of observing images of external scenes outside of the vehicle 10;

S220: the processor 120 identifies a vehicle V1 and a plurality of features on exterior of the vehicle V1 in the series of observing images in a low power mode of the driving assistance warning system 100;

S230: the processor 120 determines a reference vector R1 corresponding to a travel direction of the vehicle V1 according to at least two of the plurality of features on the vehicle V1;

S240: the processor 120 determines if a change of a detection value relating to the reference vector R1 in the series of observing images exceeds a predetermined threshold;

S250: in response to the processor 120 determining that the change of the detection value relating to the reference vector R1 exceeds the predetermined threshold, the processor 120 determines that the vehicle V1 has changed the travel direction;

S260: the processor 120 generates a trust index according to at least one environment condition of an observing image;

S270: the processor 120 makes the driving assistance warning system 100 exit from the low power mode when the trust index is smaller than a threshold value.

In step S210, the image capturing device 110 can capture the external scenes outside of the vehicle 10 to generate a series of observing images. Afterwards, the processor 120 can identify the vehicle V1 in the observing images and the features on exterior of the vehicle V1 in step S220. Also, in step S230, the reference vector R1 can be determined according to two of the features on the vehicle V1.

In some embodiments, the processor 120 can use the two grips at the same side of the vehicle V1 or the two wheels at the same side of the vehicle V1 as two features. In this case, step S230 can be performed by locating the center points of two features, and connecting the two center points to form the reference vector R1 as shown in FIG. 2

Since the relative positions of the two features on the vehicle V1 are fixed, the reference vector R1 determined according to the two features would be related to the travel direction of the vehicle V1. In other words, by tracking the detection value of the reference vector R1 in the series of observing images, the change of the travel direction of the vehicle V1 can be detected. In some embodiments, the detection value of the reference vector R1 can be, for example, the angle of the direction of the reference vector R1 or the projection length of the reference vector R1 along the observing direction of the image capturing device 110. In addition, the method 200 can also have the processor 120 set the predetermined threshold according to the moving speed of the vehicle 10 so the driver can receive the feedback in time in different driving situations.

In step S240, the processor 120 can determine if the change of the detection value relating to the reference vector R1 in the series of observing images exceeds a predetermined threshold. When the detection value of the reference vector R1 exceeds the predetermined threshold, the processor 120 will determine that the vehicle V1 has changed the travel direction in step S250, and the processor 120 may exit the low power mode to further identify the movement of the vehicle V1, including the speed and the travel direction of the vehicle V1. Consequently, the processor 120 can send a warning signal to the vehicle 10, send a warning signal to the vehicle V1, or control the vehicle 10 to automatically avoid the vehicle V1 according to the movement of the vehicle V1, improving the driving safety.

In addition, in step S260, the processor 120 can generates a trust index according to the environment conditions in the observing image, such as the weather condition or the environment brightness, so as to determine whether to have driving assistance warning system exit the low power mode or not. That is, when the environment is in a bad condition and may cause limited sight distance and difficulty in image identification, the driving assistance warning system 100 can exit the low power mode in step S270, and identify the movement of the vehicle V1 with more dedicated algorithms and more complicated computations, avoiding the driving threats caused by misidentification.

Furthermore, if the driving assistance warning system 100 has recorded the parameters of the position and the capturing angle of the image capturing device 110, then the processor 120 can further calculate the relative positions of the vehicle V1 and the vehicle 10 in the three-dimensional reality space according to the plurality of features on the vehicle V1.

In summary, the vehicles equipped with the driving assistance warning systems and the method for operating the driving assistance warning system provided by the embodiments of the present invention can identify the features on the front vehicle and determine the reference vector according to the features in a low power mode. Therefore, the change of the travel direction of the front vehicle can be identified according to the reference vector. That is, the driving assistance warning systems and the method for operating the driving assistance warning system can identify the movement of the front vehicle with simple computations, and the result of the identification can be used to determine whether more complicated computations are needed or not. Therefore, the power consumption and the computation resources can be saved while the driving safety can still be preserved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vehicle equipped with a driving assistance system with a low power mode, the driving assistance system comprising:
    an image capturing device disposed in the vehicle, and configured to capture external scenes outside of the vehicle to generate a series of observing images; and
    a processor configured to, when in the low power mode:
        identify a second vehicle and a plurality of features on exterior of the second vehicle in the series of observing images;
        determine a reference vector corresponding to a travel direction of the second vehicle according to at least two of the plurality of features;
        determine if a change of a detection value relating to the reference vector in the series of observing images exceeds a predetermined threshold; and
        in response to determining that the change of the detection value relating to the reference vector in the series of observing images exceeds the predetermined threshold, determine that the second vehicle has changed the travel direction;
    wherein the plurality of features are exterior structures on a body of the second vehicle, and the plurality of features are located at fixed positions relative to a road surface; and
    wherein the reference vector is determined by locating center points of two of the plurality of features and connecting the two center points.

2. The vehicle of claim 1, wherein the detection value relating to the reference vector is an angle between the reference vector and a predetermined vector.

3. The vehicle of claim 2, wherein the predetermined vector is a vertical vector in the series of observing images or the predetermined vector is a vector corresponding to a traffic lane the vehicle is traveling on.

4. The vehicle of claim 2, wherein the second vehicle is determined to be turning into the travel path of the vehicle when the change of the angle is positive; the second vehicle is determined to be turning away from the travel path of the vehicle when the change of the angle is negative.

5. The vehicle of claim 1, wherein the processor is further configured to exit the low power mode in response to determining that the travel direction of the second vehicle is changed.

6. The vehicle of claim 1, wherein:
    the detection value relating to the reference vector is a projection length of the reference vector along an observing direction of the image capturing device.

7. The vehicle of claim 1, wherein:
    the plurality of features of the second vehicle are the two grips on doors at a same side of the second vehicle or the two wheels at a same side of the second vehicle.

8. The driving assistance warning system of claim 1, wherein the processor is further configured to:
    generate a trust index according to at least one environment condition of an observing image; and
    when the trust index is smaller than a threshold value, make the driving assistance warning system exit from the low power mode;
    wherein the at least one environment condition comprises a weather condition and an environment brightness.

9. The vehicle of claim 1, wherein the processor is further configured to set the predetermined threshold according to a moving speed of the vehicle.

10. A method, comprising:
    generating, by an image capturing device disposed in a first vehicle, a series of observing images of external scenes outside of the first vehicle;
    identifying, by a processor of the first vehicle driving assistance system in the first vehicle when operating in a low power mode, a second vehicle and a plurality of features on exterior of the second vehicle in the series of observing images;
    determining, by the processor, a reference vector corresponding to a travel direction of the second vehicle according to at least two of the plurality of features;
    determining, by the processor, if a change of a detection value relating to the reference vector in the series of observing images exceeds a predetermined threshold; and
    in response to determining that the change of the detection value relating to the reference vector in the series of observing images exceeds the predetermined threshold, determining that the second vehicle has changed in the travel direction;
    wherein the plurality of features are exterior structures on a body of the second vehicle, and the plurality of features are located at fixed positions relative to a road surface; and
    wherein determining, by the processor, the reference vector corresponding to the travel direction of the second vehicle according to the at least two of the plurality of features comprises:
        locating center points of two of the plurality of features; and
        connecting the two center points to form the reference vector.

11. The method of claim 10, wherein the detection value relating to the reference vector is an angle between the reference vector and a predetermined vector.

12. The method of claim 10, wherein the predetermined vector is a vertical vector in the series of observing images, or the predetermined vector is a vector corresponding to a traffic lane the first vehicle is traveling on.

13. The method of claim 11 further comprising:
  determining, by the processor, that the second vehicle is turning into the travel path of the first vehicle when the change of the angle is positive; and
  determining, by the processor, that the second vehicle is turning away from the travel path of the first vehicle when the change of the angle is negative.

14. The method of claim 10, further comprising the processor exiting the low power mode in response to determining that the travel direction of the second vehicle is changed.

15. The method of claim 10, further comprising:
  the detection value relating to the reference vector is a projection length of the reference vector along an observing direction of the image capturing device.

16. The method of claim 15, wherein the plurality of features of the second vehicle are the two grips on doors at a same side of the second vehicle or the two wheels at a same side of the second vehicle.

17. The method of claim 10 further comprising:
  generating, by the processor, a trust index according to at least one environment condition of an observing image; and
  making the driving assistance warning system exit from the low power mode when the trust index is smaller than a threshold value;
  wherein the at least one environment condition comprises a weather condition and an environment brightness.

18. The method of claim 10, further comprising setting, by the processor, the predetermined threshold according to a moving speed of the first vehicle.

* * * * *